US007541089B1

(12) United States Patent
Miksic et al.

(10) Patent No.: US 7,541,089 B1
(45) Date of Patent: Jun. 2, 2009

(54) COMPOSITION AND METHOD FOR PRESERVING POSTTENSIONING CABLES IN METAL REINFORCED CONCRETE STRUCTURES

(75) Inventors: Boris A. Miksic, North Oaks, MN (US); Alla Furman, Shoreview, MN (US); Margarita Kharshan, Little Canada, MN (US); Jessica Jackson, Hudson, WI (US)

(73) Assignee: Cortec Corporation, St. Paul, MN (US)

( * ) Notice: Subject to any disclaimer, the term of this patent is extended or adjusted under 35 U.S.C. 154(b) by 1270 days.

(21) Appl. No.: 10/316,697

(22) Filed: Dec. 10, 2002

Related U.S. Application Data

(63) Continuation-in-part of application No. 10/103,249, filed on Mar. 20, 2002, now Pat. No. 7,048,873, which is a continuation-in-part of application No. 09/861,906, filed on Mar. 21, 2001, now Pat. No. 6,764,615.

(51) Int. Cl.
  *B32B 15/00* (2006.01)
  *E04C 5/08* (2006.01)
(52) U.S. Cl. .................. 428/379; 428/375; 428/378; 428/389; 52/223.1; 52/223.14; 252/388; 252/389.1; 252/389.61; 252/389.62
(58) Field of Classification Search .............. 428/375, 428/378, 379, 389; 52/223.1, 730.2, 731.1, 52/740.1, 740.4, 223.14; 252/389.1, 389.61, 252/389.62, 389
See application file for complete search history.

(56) References Cited

U.S. PATENT DOCUMENTS

| | | | | |
|---|---|---|---|---|
| 3,210,207 A | * | 10/1965 | Dodson et al. ............. 106/728 |
| 3,513,609 A | * | 5/1970 | Lang ........................ 52/223.6 |
| 3,579,931 A | * | 5/1971 | Lang ........................ 52/745.21 |
| 4,759,864 A | * | 7/1988 | Van Neste et al. ............. 252/75 |
| 5,224,774 A | | 7/1993 | Valle et al. |
| 5,574,816 A | * | 11/1996 | Yang et al. .................. 385/109 |
| 5,597,514 A | * | 1/1997 | Miksic et al. ............... 252/390 |
| 5,628,822 A | | 5/1997 | Hogan |
| 5,714,093 A | * | 2/1998 | Heimann et al. ....... 252/389.62 |
| 5,744,257 A | | 4/1998 | Carstens |
| 5,750,053 A | * | 5/1998 | Miksic et al. .......... 252/389.52 |
| 5,871,668 A | * | 2/1999 | Heimann et al. ....... 252/389.62 |
| 6,054,512 A | * | 4/2000 | Nelson et al. .................. 524/91 |
| 6,085,905 A | * | 7/2000 | Miksic et al. ............. 206/524.4 |
| 6,174,461 B1 | | 1/2001 | Miksic et al. |
| 6,503,993 B1 | * | 1/2003 | Huovinen et al. ......... 526/348.1 |
| 6,555,600 B2 | * | 4/2003 | Sobkin et al. ................ 523/351 |
| 6,764,615 B2 | * | 7/2004 | Miksic et al. ............... 252/388 |
| 2002/0195590 A1 | * | 12/2002 | Miksic et al. ............... 252/387 |
| 2004/0127606 A1 | * | 7/2004 | Goodwin ........................ 524/2 |

* cited by examiner

*Primary Examiner*—Jill Gray
(74) *Attorney, Agent, or Firm*—Haugen Law Firm PLLP

(57) ABSTRACT

A sheathed posttensioning cable assembly including an elongated metallic cable and a coaxially disposed outer sheath, with the cable assembly including a polymeric resin fiber/filament impregnated with a migratory corrosion inhibitor being inserted within the sheath and extending along the length of the cable. The polymeric resin is preferably polypropylene, polyethylene, nylon, or polyethylene terephthalate, with the corrosion inhibitor comprising a 50:50 blend of sodium benzoate and alkali metal sebacate. The inhibitor preferably comprises between 5% and 10% by weight of the impregnated fiber/filament.

7 Claims, 1 Drawing Sheet

COMPOSITION AND METHOD FOR PRESERVING POSTTENSIONING CABLES IN METAL REINFORCED CONCRETE STRUCTURES

CROSS-REFERENCE TO RELATED APPLICATIONS

The present application is a continuation-in-part of our application Ser. No. 10/103,249, now U.S. Pat. No. 7,048,873 filed Mar. 20, 2002, entitled "COMPOSTION AND METHOD FOR REPAIRING METAL REINFORCED CONCRETE STRUCTURES" which is a continuation-in-part of our application Ser. No. 09/861,906, now U.S. Pat. No. 6,764,615, filed May 21, 2001, entitled "MIGRATING CORROSION INHIBITOR FIBERS" and each being assigned to the same assignee as the present application.

BACKGROUND OF THE INVENTION

The present invention relates generally to an improved composition and method for preserving metal reinforced concrete structures, and more particularly to such a composition and method specifically adapted for application as a fiber or filament (hereinafter fiber/filament) blended with a selected migratory corrosion inhibitor and disposed within the encapsulating sheath of posttensioning cables utilized in such concrete structures. Posttensioning cables are used for the purpose of compressing cast concrete beams or other structural members to impart the characteristics of pre-stressed concrete to these members.

The compositions of the present invention employ an impregnated fiber or filament in combination with posttensioning cable reinforcements, with the impregnated filament being disposed within the confines of the cable-enclosing sheathing, thereby providing for long-term protection of the metallic cable components within what may otherwise be a hostile environment. Posttensioning cables may be employed in combination with the compositions disclosed in co-pending application Ser. No. 09/861,906, now U.S. Pat. No. 6,764,615, and entitled "MIGRATORY CORROSION INHIBITOR FIBERS", with the formulations of the present invention enhancing the protection available to the posttensioning cables. The mixtures or blends disclosed in application Ser. No. 09/961,906 now U.S. Pat. No. 6,764,615, are particularly adapted for repairing the surfaces of concrete structures, while at the same time for use in passivating and otherwise protecting the surfaces of metal reinforcements present in damaged concrete structures over extended periods of time. The system of the present invention may be utilized in combination with such mixtures or blends. The environmentally friendly migratory corrosion inhibitors are preferably a mixture of sodium benzoate and an alkali metal sebacate such as sodium sebacate and/or potassium sebacate. In accordance with the present invention, the migratory corrosion inhibitors may be present as an impregnant in the oriented filaments or fibers disposed within the cable-enveloping sheath, with such material being typically in addition to any inhibitors that may be present in the mortar/aggregate blend. An inhibitor source may be contained in an extruded reinforcing plastic fiber comprising a polymeric resin matrix into which a quantity of the migratory corrosion inhibitors set forth above has been co-extruded. It will be appreciated that the posttensioning cable reinforcement preservation features of the present invention may be applied to a wide variety of structures, including those which include various types of posttensioning cable reinforcement. Those of skill in the art will, of course, be able to select the appropriate cable for given applications.

The migratory corrosion inhibitors present in the improved formulation, preferably sodium benzoate and sodium sebacate are supplied as an impregnant in the fiber disposed within the confines of the sheathing envelope of posttensioning cable, with the migratory corrosion inhibitors being released from the fiber to the metallic cable over a relatively extended period of time. The inhibitor formulation is suited for co-extrusion with reinforcing fibers or filaments, and may be employed in combination with such filaments fabricated from synthetic resins such as polyethylene, polypropylene, nylon, polyethylene terephthalate, as well as others.

The fiber or filament forming composition is typically prepared in a form where it may be added or blended with the fiber or filament matrix material held within the extrusion barrel of a typical filament extruder. The inhibitor material, as co-extruded, impregnates the fiber and is present at the time the fiber is oriented subsequent to exiting the extruder. Typically, the formulations of the present invention include between about 5% and 10% by weight of migratory corrosion inhibitor, balance resin. For most applications, polyethylene, polypropylene, nylon such as Nylon 66 or Nylon 6 are suited for this application, as well as those fabricated from polyethylene terephthalate. The high temperature properties of the selected inhibitors are such that they provide compatability with the plastic resin matrix. The fiber or filament forming composition is typically prepared in two components consisting of the plastic resin and plastic resin substrate forming material. The blend is then co-extruded as an impregnated fiber or filament. Prior to extrusion, the blends are mixed together to form the extrudate which is then ready.

Following extrusion, the fiber or filament is cooled, and thereafter oriented to a typical extent or degree. Since the fibers retain a substantial amount of their tensile properties, typical orientation procedures may be utilized, typically an elongation of 200%. These fibers have excellent durability and are resistant to water and/or carbonation attack. In addition to these mechanical properties, the impregnated fibers or filaments provide excellent corrosion protection to the metallic reinforcement contained within the sheathed posttensioning cable, thus extending the longitivity of these components. The compositions of the present invention accordingly increase the quality, integrity, and also extend the life of the cable structure.

The inhibitors which have been incorporated directly into the co-extruded fiber generally evolve slowly. These molecules migrate to provide ongoing protection to the metallic cable. The inhibitors selected for the current application possess the characteristic of being able to migrate from the impregnated filament onto and along the surfaces of the metallic members. The corrosion inhibitors present in the sheathed or encapsulated cable deliver long-term corrosion protection by retarding the rate of corrosion on the steel cable reinforcements.

The migratory corrosion inhibitor impregnated fiber/filament components may extend continuously as a single component along the entire length of the cable, or alternatively inserted as individual segments or components of shorter length. When an array of components is utilized, it is generally desirable to have at least one such fiber/filament present at all points along the extent of the posttension cable being protected.

As indicated hereinabove, the source of migratory corrosion inhibitors is from an extruded fiber or filament comprising a polymeric resin matrix into which a quantity of migratory corrosion inhibitors has been co-extruded. The co-extruded inhibitors preferably include sodium benzoate and sodium sebacate.

Thus, the composition and methods of the present invention provide a medium for ongoing metallic surface protection through extended delivery of migratory corrosion inhibitors to and throughout the length of the cable. The features of the invention are achieved through the addition of these impregnated fibers or filaments directly to the interior or confines of the sheathed cable, with the utilization providing extended long-term corrosion inhibitor availability.

The improved composition and method of application in accordance with the present invention offers engineers, property owners, contractors, DOTs and other governmental agencies a corrosion inhibiting technology adapted to extend the life of concrete structures employing posttensioning cables The composition and formulations of the present invention enable the artisan to employ these reinforcements in a wider variety of structures. Because of the nature of the improved compositions, the corrosion inhibited tensioned cables may be employed in a conventional manner.

Because of their physical and chemical nature, the migratory corrosion inhibitors present in the formulations, form a protective layer or deposit directly onto metallic surfaces. In addition to those areas which are in direct contact with the impregnated fiber or filament, the migratory properties of the inhibitors extend protection to metallic surfaces surrounding or otherwise spaced from the impregnated fiber, such as in and around the core or axis. In addition to protection afforded the metallic components, the inhibitors may protect the surface of the concrete immediately adjacent the sheath against further carbonation or attacks by chlorides and/or acid rain.

Given the advantageous features of the working formulations of the present invention, the posttensioned cables may be utilized in a variety of concrete structures. Such structures include, by way of example, steel-reinforced concrete bridges, parking decks, ramps, and garages exposed to corrosive environments such as carbonation, deicing salts, and possible atmospheric attack. In general, these cables may be utilized to enhance the useful life of virtually any type of reinforced concrete, commercial and/or civil engineered structures.

SUMMARY OF THE INVENTION

In accordance with the present invention, the environmentally suitable corrosion inhibitors utilized are preferably a 50:50 blend of sodium benzoate and the alkali metal salt of a fatty acid, namely sodium or potassium sebacate, with sodium sebacate being normally preferred.

As reinforced concrete structures age, oxidation of the metallic reinforcement typically has resulted in a deterioration of the tensioned cable. That deterioration adversely affects the quality or integrity of concrete structure. The improved tensioned cables of the present invention may be utilized in combination with other inhibitors employed within the reinforced concrete members. The presence of the migratory corrosion inhibitors in the cable assembly extends the useful life of the cables to a degree consistent with that which may be achieved through employing the concrete inhibitors in the manner set forth in co-pending application Ser. No. 09/861,906, filed May 21, 2001.

Therefore, it is a primary object of the present invention to provide an improved migratory corrosion inhibiting system for extended protection of steel reinforcements used in posttensioned cables, wherein the selected corrosion inhibitors are blended into and incorporated with a fiber or filament disposed within the cable-enveloping sheathing.

It is a further object of the present invention to provide an improved protection for posttensioned cables utilized in concrete structures wherein migratory corrosion inhibitors are blended with a plastic resin matrix and co-extruded into fiber or filament, with the blended inhibitors being primarily a 50:50 blend of an alkali metal sebacate and alkali metal benzoate.

Other and further objects of the present invention will become apparent to those skilled in the art upon a study of the following specification, accompanying drawings, and appended claims.

IN THE DRAWINGS

DESCRIPTION OF THE PREFERRED EMBODIMENT

Figure 1:
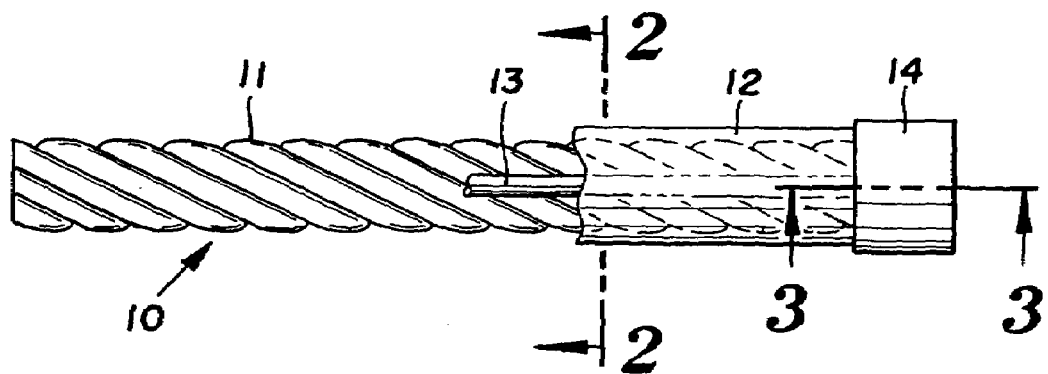
FIG. 1 is an elevational view of a sheathed cable incorporating the impregnated fiber/filament in accordance with the present invention, with the sheath portion of the structure being shown partially broken away to expose the cable and the fiber/filament.
Figure 2:
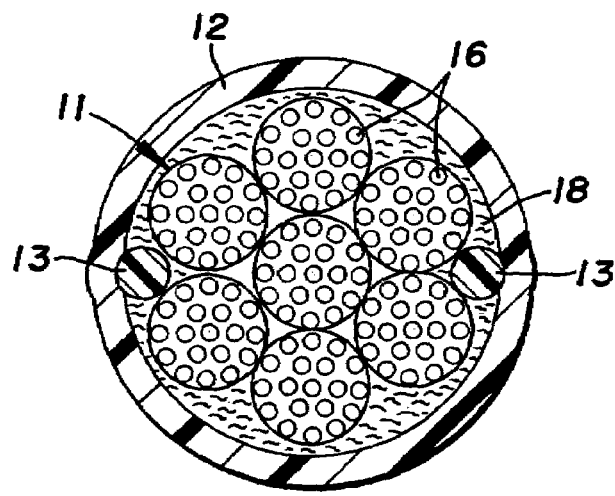
FIG. 2 is a transverse sectional view taken along the line and in the direction of the arrows 2—2 of FIG. 1.

Migratory corrosion inhibitors were blended with a Plastic resin matrix mixture pursuant to the following procedure:

Migratory Corrosion Inhibitor Formulation

A preferred working formulation of migratory corrosion inhibitors was prepared from the following blend:

| Component | Parts by Weight |
| --- | --- |
| Sodium benzoate | 50 parts |
| Sodium sebacate | 50 parts. |

EXAMPLE 1

| Component | Parts by Weight |
| --- | --- |
| Nylon 66 | 92 |
| Sodium benzoate | 4 |
| Sodium sebacate | 4. |

EXAMPLE 2

| Component | Parts by Weight |
| --- | --- |
| Polypropylene | 92 |
| Sodium benzoate | 4 |
| Sodium sebacate | 4. |

The mixture is thoroughly blended and placed within the barrel of a typical extruder, with the extruder forming a monofilament structure, which when oriented at 200%, has a diameter of 100 mils. Barrel temperatures range from between about 250° C. to 270° C. Those of skill in the filament extrusion art will, of course, know the appropriate diameter of the extrusion die to be employed in this operation. It will be appreciated, of course, that filaments other than monofilaments may be employed, including multi-fiber filaments of reduced diameter woven together to form a multi-filament strand.

In other words, similar formulations of migratory corrosion inhibitors may be prepared utilizing potassium sebacate or sodium benzoate in place of the sodium sebacate of this formulation.

These inhibitors are preferably added in substantially equal quantities, although variations may be made wherein the ratio of sodium benzoate is varied from between about 40% to 70% by weight, balance sodium sebacate, potassium sebacate, or sodium benzoate. While sodium sebacate is the preferred salt of a fatty acid, potassium sebacate may be employed as a substitute for sodium sebacate with satisfactory results.

| Component | Parts by Weight |
|---|---|
| Polyethylene terephthalate | 95 |
| Sodium benzoate | 2.5 |
| Sodium sebacate | 2.5. |

EXAMPLE 3

The materials present in this working Example 2 are blended, extruded, and utilized consistent with the steps in Example 1.

| Component | Parts by Weight |
|---|---|
| Nylon 6 | 90 |
| Sodium benzoate | 5 |
| Sodium sebacate | 5. |

EXAMPLE 4

The materials present in this working Example 4 are blended, extruded, and utilized consistent with the steps in Example 1. The barrel temperatures range from between about 220–250° C. Similar results are obtained with these fibers.

| Component | Parts by Weight |
|---|---|
| Nylon 66 | 90 |
| Sodium benzoate | 5 |
| Sodium sebacate | 5. |

EXAMPLE 5

The materials present in this working Example 5 are blended, extruded, and utilized consistent with the steps in Example 1.

| Component | Parts by Weight |
|---|---|
| Nylon 6 | 94 |
| Sodium benzoate | 3 |
| Sodium sebacate | 3. |

EXAMPLE 6

The materials present in this working Example 6 are blended, extruded, and utilized consistent with the steps in Example 3.

| Component | Parts by Weight |
|---|---|
| Polypropylene | 92 |
| Sodium sebacate | 4 |
| Sodium benzoate | 4. |

EXAMPLE 7

The materials present in this working Example 7 are blended, extruded, and utilized consistent with the steps in Example 1. Barrel temperatures range from between about 165–175° C.

| Component | Parts by Weight |
|---|---|
| Polypropylene | 94 |
| Sodium sebacate | 3 |
| Sodium benzoate | 3. |

EXAMPLE 8

The materials present in this working Example 8 are blended, extruded, and utilized consistent with the steps in Example 1.

Reinforcement Fibers

The migratory corrosion inhibitors contained within a polymeric resin matrix are preferably co-extruded with nylon or polyethylene terephthalate resin. Alternatively, certain polyolefin resins such as polypropylene or polyethylene may be employed. U.S. Pat. No. 6,054,512, assigned to the same assignee as the present invention and incorporated by reference herein, describes certain other techniques for incorporation of corrosion inhibitors in a polymeric resin. It has been found that fibers prepared in accordance with the present invention are well adapted to a two-step process including preparation of a masterbatch containing approximately 50% migratory corrosion inhibitors, with the masterbatch being subsequently extended through incorporation of additional raw resin.

Posttensioned Cable Assembly

With attention now being directed to FIG. 1 of the drawings, the posttensioning cable assembly generally designated 10 comprises a conventional steel cable component 11 having a sheathing or shield 12 enveloping the cable. Such cables are commercially available. The sheathed cable includes migratory corrosion inhibitor fiber/filament 13 within the sheath. In many applications, end cap 14 will be provided at an appropriate terminus of the assembly.

Figure 3:
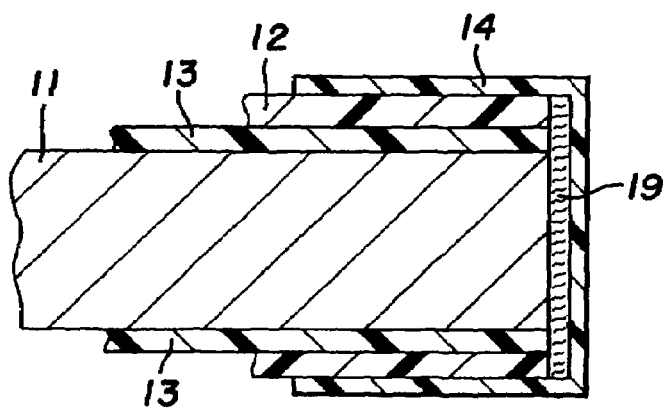
FIG. 3 is an axial sectional view taken along the line and in the direction of the arrows 3—3 of FIG. 1.

Cable 11 comprises a number of individual smaller cable components 16—16 which are wound together in the typical or conventional fashion. Fiber fill may be also employed, such as indicated at 18. Migratory corrosion inhibitor impregnated fiber/filaments 13—13 are provided within the confines of sheathing 12, and are accordingly held in contact with the surfaces of cable 11. In certain applications, a grout layer may be interposed between the terminal end of assembly 10 and end cap 14, with the grout layer being illustrated at 19 in FIG. 3.

SUMMARY

The present invention provides an environmentally friendly concrete improvement system which incorporates migratory corrosion inhibitors for enhancing the quality and anticipated lifetime of posttensioning cables used in concrete structures.

It will be appreciated that the specific examples provided herein are for purposes of illustration only and are not to be otherwise construed as a limitation upon which the invention would otherwise be entitled.

What is claimed is:

1. In combination with a sheathed posttensioned cable assembly including an elongated metallic cable and a coaxially disposed outer sheath, the improvement comprising:

a polymeric resin member selected from the group consisting of: a fiber, a filament, and combinations thereof, said member being inserted within a chamber defined by said sheath and extending generally continuously along the length thereof, said member comprising between about 5% and 10% by weight migratory corrosion inhibitor, and a polymeric resin matrix, wherein said migratory corrosion inhibitor comprises a blend of sodium benzoate and an alkali metal sebacate.

2. The combination as set forth in claim 1 wherein said polymer resin matrix is selected from the group consisting of polyethylene, polypropylene, Nylon 6, Nylon 66, and polyethylene terephthalate.

3. The combination as set forth in claim 1 wherein said polymeric resin matrix is co-extruded with said migratory corrosion inhibitor component.

4. The combination of claim 1 wherein said polymeric resin member extends substantially continuously along the length of said elongated metallic cable.

5. The combination of claim 4 wherein at least two polymeric resin members are provided.

6. The combination of claim 1 wherein said polymeric resin member comprises a discontinuous array of individual distinct member segments of random length.

7. The combination of claim 1 including a plurality of substantially continuous polymeric resin members, each of said polymeric resin members comprising polymeric resin matrix and migratory corrosion inhibitor.

* * * * *